United States Patent [19]

Buchner et al.

[11] 3,735,049

[45] May 22, 1973

[54] TELECOMMUNICATION SYSTEM WITH TIME DIVISION MULTIPLEX

[75] Inventors: Robert Bertold Buchner; Jan Philippus Maat, both of Hilversum, Netherlands

[73] Assignee: U.S. Philips Corporation, New York, N.Y.

[22] Filed: Mar. 19, 1971

[21] Appl. No.: 126,150

[30] Foreign Application Priority Data

Apr. 10, 1970 Netherlands ........................7005143

[52] U.S. Cl. ..........................179/15 AQ, 179/15 AF

[51] Int. Cl. ..................................................H04j 3/06

[58] Field of Search.....................179/15 AQ, 15 AT, 179/18 GF, 18 J, 15 AC, 15 AF

[56] References Cited

UNITED STATES PATENTS

| | | | |
|---|---|---|---|
| 3,558,823 | 1/1971 | Brilliant | 179/15 AC |
| 3,458,659 | 1/1969 | Sternung | 179/15 AQ |
| 3,569,631 | 3/1971 | Johannes | 179/15 AF |

FOREIGN PATENTS OR APPLICATIONS

| | | | |
|---|---|---|---|
| 41/6376 | 4/1966 | Japan | 179/15 AQ |

*Primary Examiner*—Kathleen H. Claffy
*Assistant Examiner*—David L. Stewart
*Attorney*—Frank R. Trifari

[57] ABSTRACT

A telecommunication system with time division multiplex wherein information signals in serial form are received, converted to parallel form in a plurality of shift registers, remultiplexed and transferred to an information storage unit under the control of a local clock pulse generator and a local address generator. An overflow detector generates an overflow signal in the event that the information signals are being received faster than they can be converted to parallel form and remultiplexed. In response to the overflow signal the address generator provides overflow addresses and the excess received information is transferred through an auxiliary transfer channel to the information storage unit.

2 Claims, 10 Drawing Figures

Figure 1:
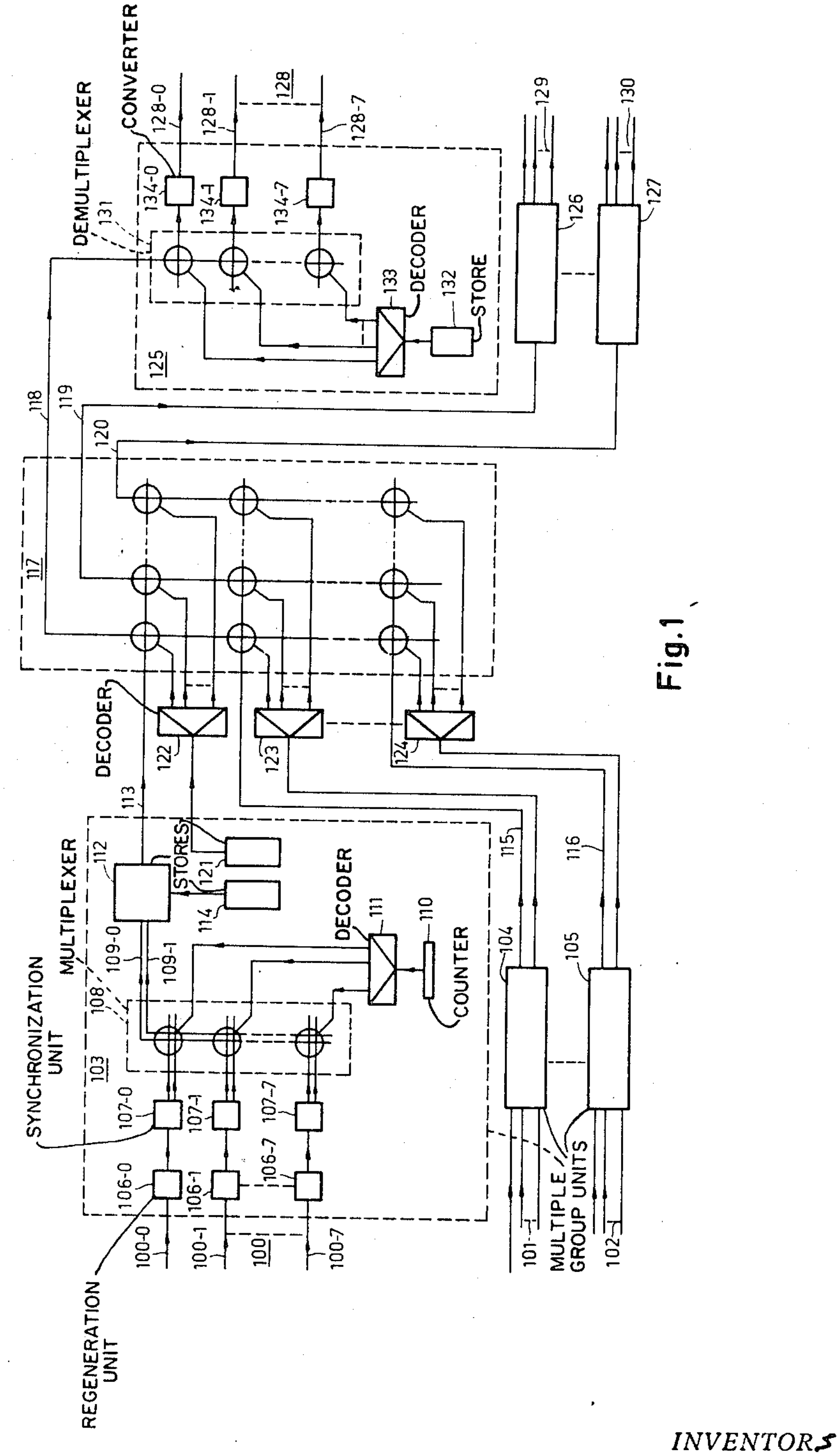

INVENTORS
ROBERT B. BUCHNER
JAN P. MAAT
BY Frank R. Trifari
AGENT

INVENTORS
ROBERT B. BUCHNER
JAN P. MAAT
BY
AGENT

INVENTORS
ROBERT B. BUCHNER
JAN P. MAAT
BY
Frank R. Trifari
AGENT

INVENTORS
ROBERT B. BUCHNER
JAN P. MAAT
BY
AGENT

*INVENTORS*
ROBERT B. BUCHNER
JAN P. MAAT
*BY*
Frank R. Trifari
AGENT

INVENTORS
ROBERT B. BUCHNER
JAN P. MAAT
BY Frank R. Trifari
AGENT

INVENTORS
ROBERT B. BUCHNER
JAN P. MAAT
BY
AGENT

*INVENTORS*
ROBERT B. BUCHNER
JAN P. MAAT
*BY*
[signature]
AGENT

TELECOMMUNICATION SYSTEM WITH TIME DIVISION MULTIPLEX

The invention relates to a telecommunication system with time division multiplex, comprising a group of sources of multiplex telecommunication signals, each of these sources comprising a group of single transmission channels, a group of clocks individually associated with the sources, each clock being adapted for generating a time scale which is divided into mutually equal frame time intervals, each of which is divided into mutually equal main time intervals, a main time interval having the same relative position in each frame time interval being associated with each single transmission channel in each frame time interval, each clock controlling the associated source for supplying an information character in each main time interval, a local clock for generating a local time scale which is divided into mutually equal local frame time intervals, each of which is divided into mutually equal local main time intervals, each of which is divided into mutually equal sub-time intervals, a group of synchronization units individually associated with the source for the temporary storage of the information characters supplied by the associated sources, a switching store comprising a multiple group of channel registers individually associated with the single transmission channels of the group of sources, a multiplex transfer unit connected between the group of synchronization units and the switching store and comprising a multiple group of connection channels having a number of connection channels which is equal to the number of single transmission channels of the group of sources, for transferring the information characters stored in the group of synchronization units to the multiple group of channel registers under the control of the local clock, a sub-time interval having the same relative position in each frame time interval being associated with each connection channel in each local frame time interval.

A telecommunication exchange in which between a group of sources of multiple telecommunication signals, for example, incoming transmission lines, and a common time transposition switching store a multiplex transfer unit is connected which comprises a multiple group of connection channels using sub-time intervals, is known from the Dutch Patent Application 6,706,929, laid open to public inspection.

The synchronization units connected between the sources of multiplex telecommunication signals and the multiplex transfer unit have the function of a buffer, for compensating for fluctuations in the supply of information due to clock speed differences and/or delay time variations. Such synchronization units usually have a very limited storage capacity, for example, 2, 3 or 4 characters. If the storage capacity is fully utilized and the supply of characters exceeds the output, which may occur when the clock of the source is faster than the local clock during a prolonged period of time, characters will be lost. It is known that the synchronization units can be read out without loss by using two read instants in every local main time interval and by suitable switching between these instants. Such a solution, however, is unfavorable because the number of read instants is doubled, which would halve the number of sub-time intervals in the telecommunication system described at the beginning of this specification. Even if the number of sub-time intervals of a main time interval were sufficient to permit two read instants for every synchronization unit, the known solution in itself is unfavorable because no sub-time intervals remain available for other functions.

The invention has for its objects to provide a telecommunication system of the type set forth at the beginning of this specification according to a novel concept of loss-free information transfer from the sources of multiplex telecommunication signals to the channel register of the multiple group, in which the drawback of the large number of required read instants of the known solution is eliminated.

The telecommunication system according to the invention is characterized in that the multiplex transmission unit comprises a number of overflow channels for transferring the excess of information characters occurring when the supply of information characters to the synchronization units exceeds the output via the multiplex unit and the storage capacity of the adaptation units has been fully utilized, to the multiple group of channel register under the control of the local clock and the synchronization units, a sub-time interval which has the same relative position in each frame time interval being associated with each overflow channel in each frame time interval.

Figure 2:
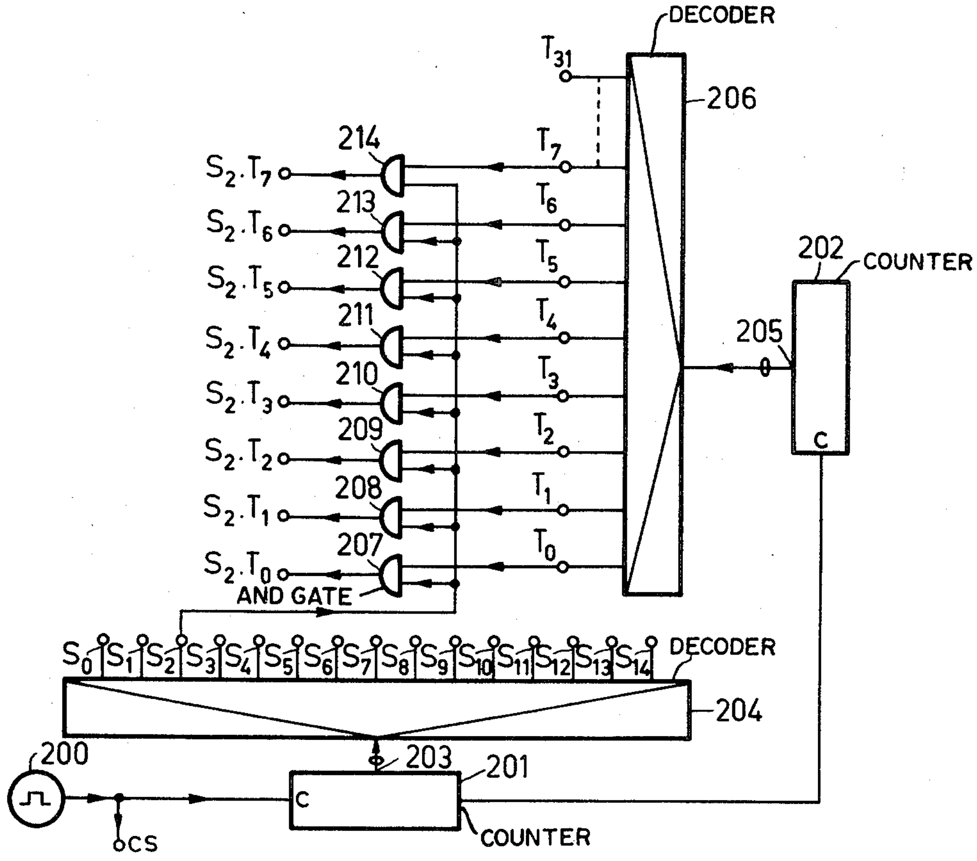
Figure 3:
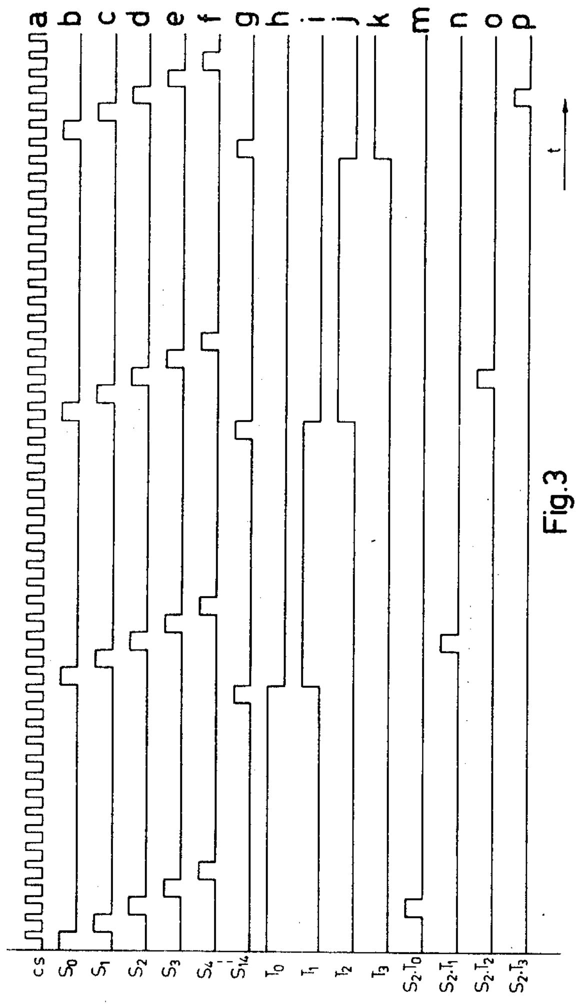
Figure 4:
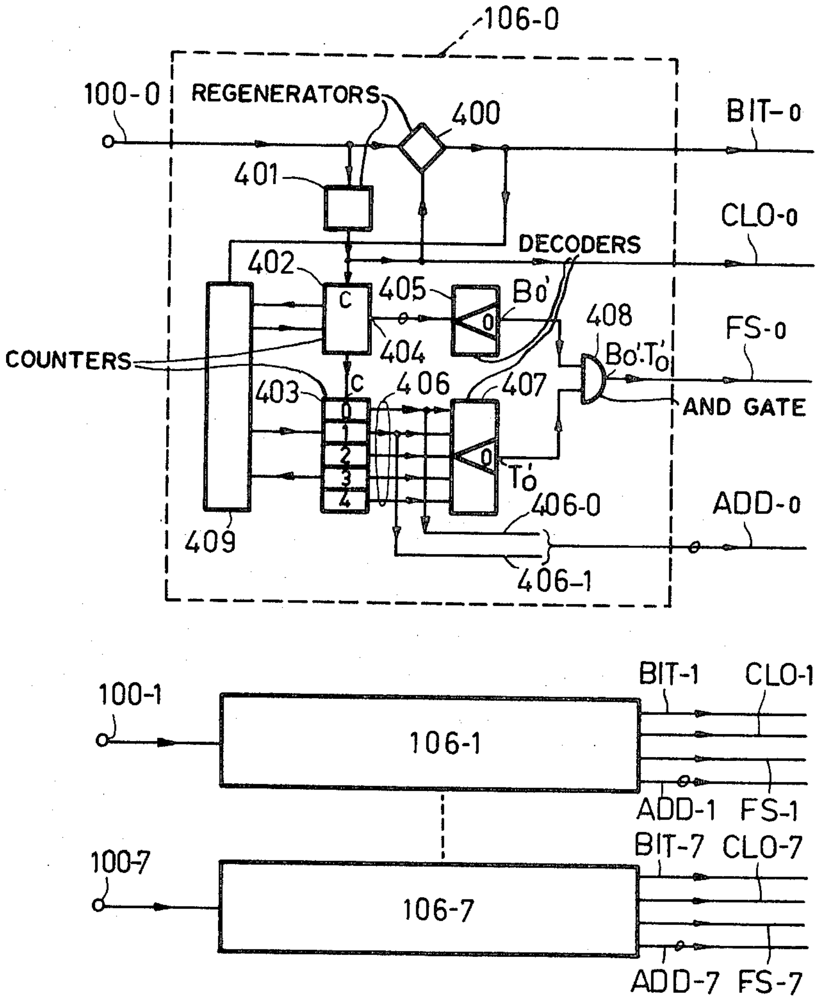
Figure 10:
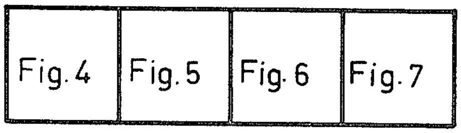
Figure 5:
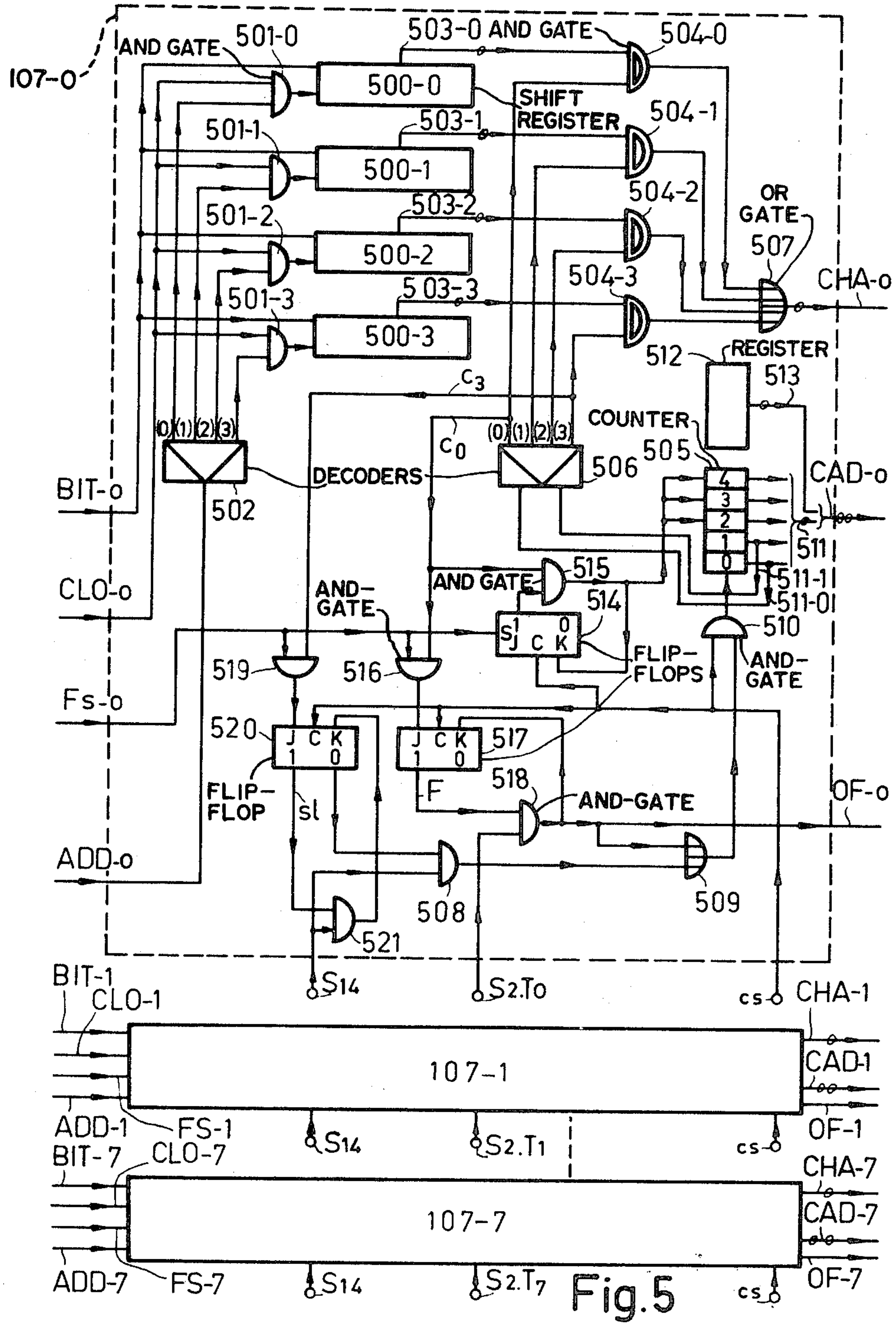
Figure 6:
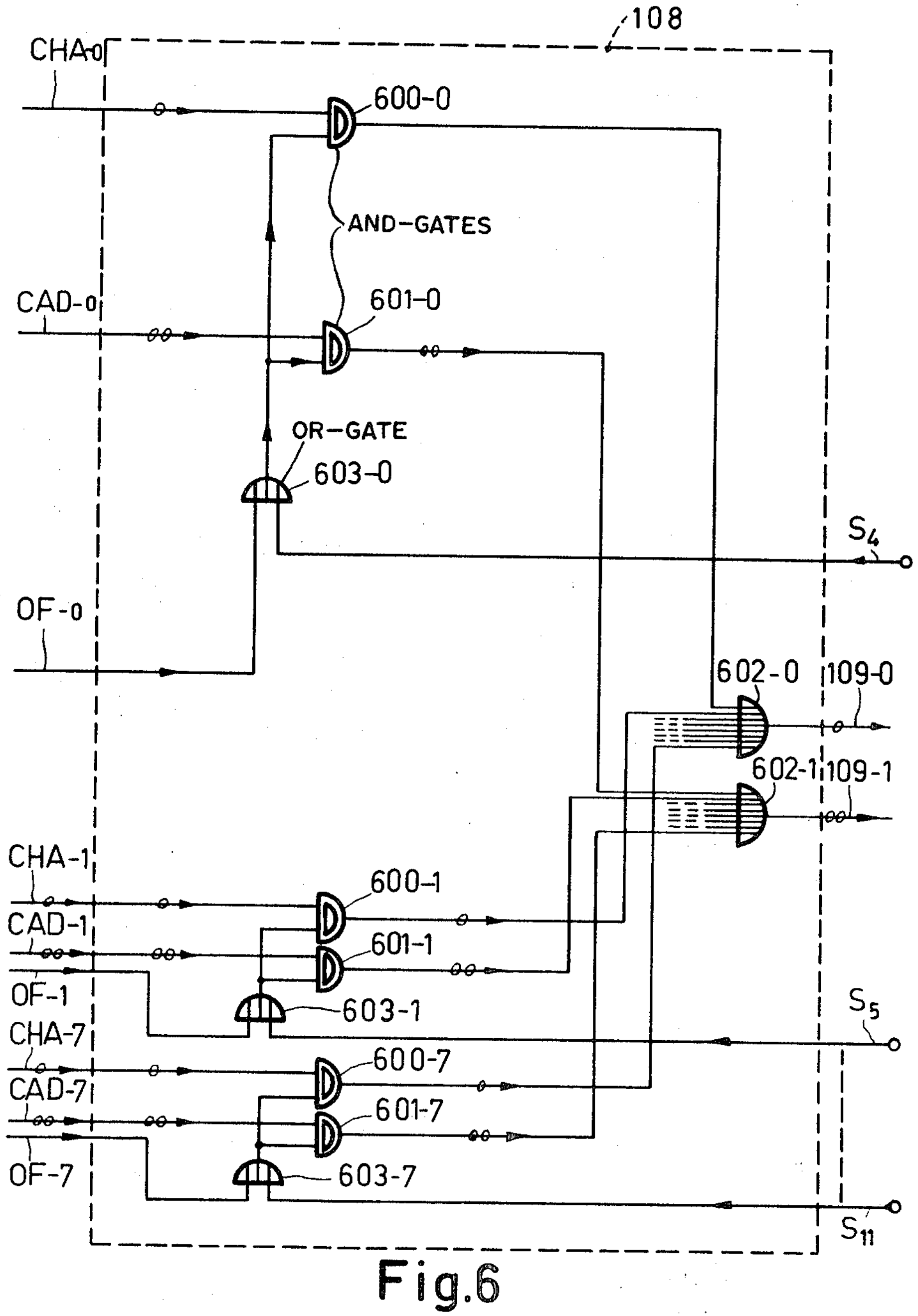
Figure 7:
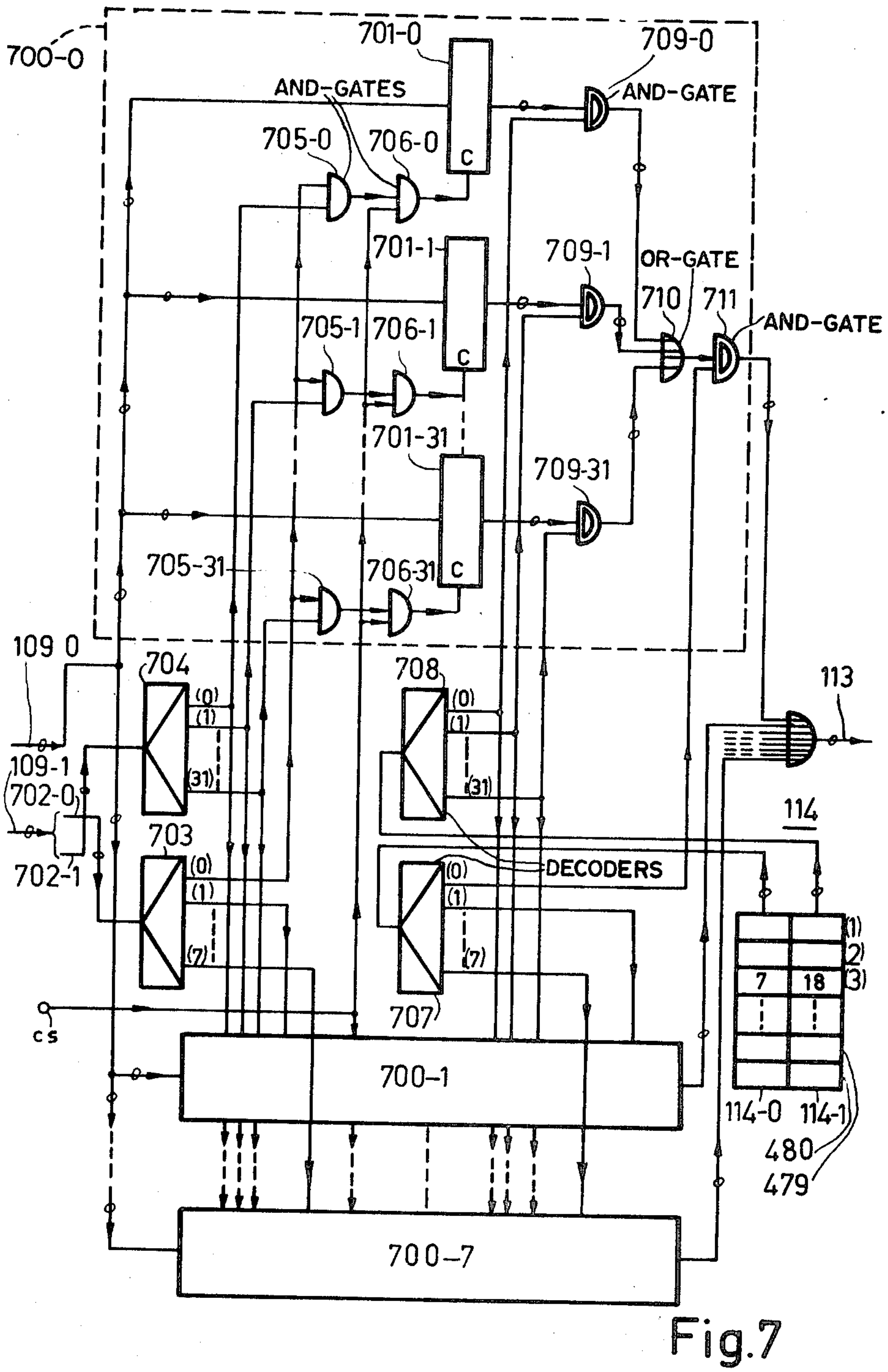
Figure 8:
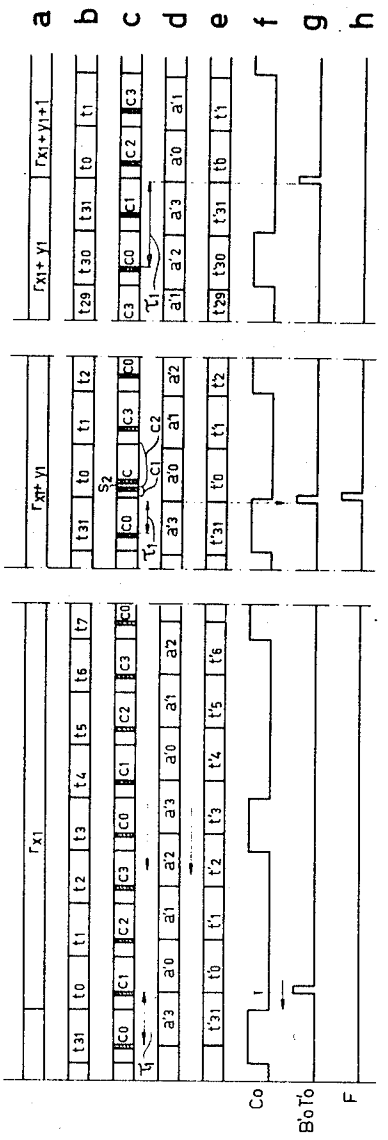
Figure 9:
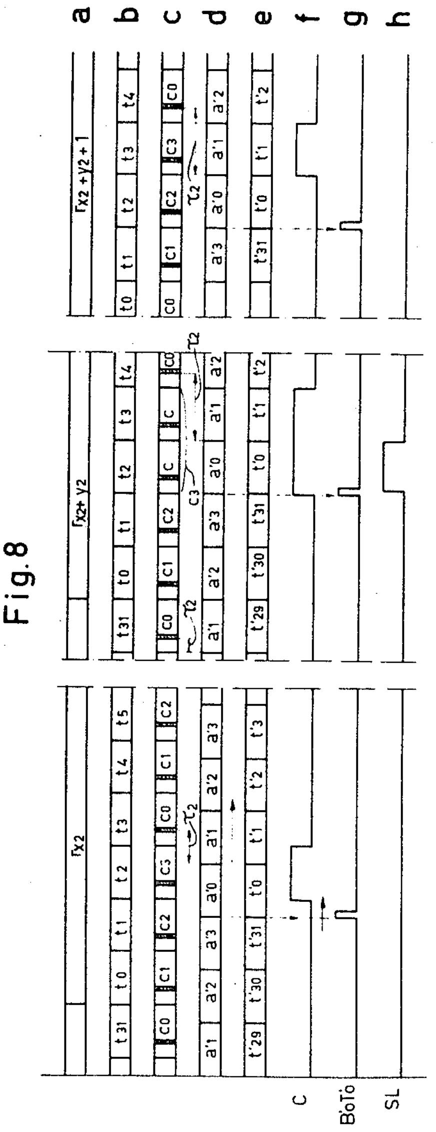

In order that the invention may be readily carried into effect, an embodiment thereof will now be described in detail, by way of example, with reference to the accompanying diagrammatic drawings, in which:

FIG. 1 is a block-schematic view of a telecommunication exchange with time division multiplex, FIG. 2 is the block diagram of the local clock, FIG. 3 shows some clock signals occurring in the clock according to FIG. 2, FIGS. 4, 5, 6 and 7 are a more detailed block diagram of a multiple group unit of the telecommunication exchange shown in FIG. 1, FIGS. 8 and 9 are time scales and signals which occur in the synchronization unit shown in FIG. 5, FIG. 10 shows the relative arrangement of FIGS. 4, 5, 6 and 7.

In FIG. 1, the reference numerals 100-0, 100-1 and 100-7 denote receive highways, each of which serves for 32 single receive channels which are combined by time division multiplexing. Through each receive channel a sequence of pulse code groups representing characters of 8 bits can be transmitted. These characters represent the amplitude values of signal samples of analogue signals, for example, speech signals, in a binary code but may alternately entirely or partly represent other data.

The multiplex signal of a receive highway and also that of a send highway, is composed of signal frames, the frame repetition frequency of which is the same throughout the entire system under consideration. A signal frame of a received or transmitted multiplex signal consists of 32 characters, i.e. one character from each single transmission channel. The bits of each character occupy successive bit positions in the signal frame. Due to this mode of transmission, the received and transmitted multiplex signals are in fact bit sequences. In each frame time interval a single transmission channel uses one channel interval having the same relative position or number in each frame time interval. This number is the number of the channel as well.

The frame repetition frequency is at the same time the character repetition frequency of a single transmission channel. This character repetition frequency remains unchanged when a receive channel is connected to a send channel via one or more swiching stages, whether or not higher-order time multiplexing is used. In system using pulse code modulation (PCM), where each character represents the amplitude value of a single sample in a binary code, the frame repetition frequency is referred to as the sample frequency and a frame time interval is referred to as the sample period.

The time scale of the transmitted multiplex signals is determined by the clock of the exchange under consideration. The time scales of the received multiplex signals are determined by the clock of the exchange or concentrators transmitting these signals. The clock of the exchange under consideration is referred to as the local clock. The clocks of the exchanges transmitting multiplex signals to the exchange under consideration are indicated as remote clocks.

The local clock divides the time axis into mutually equal local frame time intervals. Each local frame time interval is divided into 32 mutually equal local main time intervals $t_o$, $t_1$ - - -, $t_{n-1}$. Each main time interval is divided into 8 mutually equal local bit intervals $b_0$, $b_1$, - - -, $b_7$ and 15 mutually equal sub-time intervals $s_0$, $s_1$, - - -, $s_{14}$. The latter are used only in the exchange.

The channel intervals of the outgoing transmission lines are formed by the main time intervals of the local clock.

A group of 32 single transmission channels using a common transmission line forms a first-order multiplex channel. The common transmission line is referred to as a 32 channel highway. In the exchange use is made of second-order multiplex channels comprising $15 \cdot 32 =$ 480 single channnels. The channel intervals of the latter channels are formed by the sub-time intervals of the local clock, 480 of which are present in each frame time interval. A transmission line used for a second-order multiplex channel is referred to as a 480-channel highway. A character is transmitted in parallel form via a multiplex line in a sub-time interval.

The time scale of the multiplex signal is regenerated at the receiving side. For the purpose of distinction the time interval references of a regenerated time scale are provided with a prime. The regenerated time scale consists of frame time intervals which are divided into main time intervals $t'_o$, $t'_1$ - - -, $t'_{31}$, each of which is divided into bit intervals $b'_o$, $b'_1$ - - -, $b'_7$.

The highways 100-0, 100-1 and 100-7 form the first, the second and the eighth highway of a group of eight highways 100. This group of highways is referred to as a incoming multiple receive group. Further multiple groups are designated by 101 and 102 in FIG. 1.

The group of highways 100 is connected to the incoming multiple group unit 103. The multiple groups 101 and 102 are connected to the multiple group units 104 and 105. The latter are constructed in the same way as the multiple group unit 103 and are represented in FIG. 1 by blocks.

The highways 100-0, 100-1 and 100-7 are connected in the multiple group unit 103 to the regeneration units 106-0, 106-1 and 106-7. A clock regeneration unit, present in every regeneration unit, regenerates the time scale of the received multiplex signal. The frame synchronization between the regenerated time scale and the actual time scale of the received multiplex signal is effected by a frame synchronization unit using, frame synchronization information present, in one of the channel. By means of a regenerated clock signal of bit frequency the received bits are regenerated. The regeneration units 106-0, 106-1 and 106-7 are connected to the synchronization units 107-0, and 107-1 and 107-7.

Owing to speed differences between the remote clock and the local clock and/or owing to delay time variations in the transmission path, a shift varying with time occurs between the regenerated time scale and the local time scale.

For the time being it may be assumed that the shift of the regenerated multuplex signal with respect to the local time scale in the synchronization unit is rounded off to an integral number of local main time intervals by a variable time delay connected in the signal path of the regenerated multiplex signal. The synchronization unit provides a conversion of the characters from the series form into the parallel from and for each character supplies the associated channel number and line number. The latter number is permanently stored in a register of the synchronization unit.

A second-order multiplex 108 converts the $8 \cdot 32 =$ 256 incoming channels of multiple group 100 into a corresponding number of channels of the 480-channel connection highway 109-0. Multiplexer 108 is controlled by a modulo-15 sub-time interval counter 110 via decoder 111, which counter determines the cycle of multiplexer 108 on a local main time interval. In each main time interval each synchronization unit is connected in an individually associated sub-time interval to highway 109-0 in order to supply a character thereto. At the same time a connection is established with highway 109-1 in order to supply the channel number and the line number of the character thereto. The remaining 480—256 = 224 channels of highway 109-0 and highway 109-1 may be used in groups of 32 for further incoming transmission lines or other sources of multiplex signals. Some of these remaining channels are used for special purpose which will be explained hereinafter.

The twin highway 109 forms the input of a switching store 112. This store has a storage capacity such that one signal frame of each multiplex signal of the multiple group can be stored therein. The switching store comprises eight sectors and each sector comprises 32 channel registers, in each of which one character can be stored. The 256 channels of highway 109-0, corresponding to the 256 channels of the multiple received group 100, are spatially distributed in switching store 112 by storing each character in the channel register identified by the line number and the channel number.

The output of the switching store is formed by the 480-channel primary intermediate highway 113. Each incoming channel of the multiple group 100 may be connected via the corresponding channel register of switching store 112 to each channel of the primary intermediate highway 113 under the control of a cyclic addressing store 114. Hereinafter a channel of a primary intermediate highway will be referred to as a primary intermediate channel. The addressing store 114 comprises 480 storage locations which are associated in a one-to-one relatioship with the primary intermediate channels of intermediate highway 113. The address of a storage location is the same as the number of the primary intermediate channel with which the storage location is associated and via versa. The address (line number + channel number) of a recieve channel can be stored in each storage location. The cycle of the addressing store is equal to one frame time interval. In each frame time interval the contents of every storage location appears at the output of the addressing store in the sub-time interval of the primary intermediate channel, and is applied to the switching store 112. The address of a receive channel identifies the channel register of the channel and when supplied to the switching store ensures the transfer of the character stored in the channel register to intermediate highway 113. The storage of the address of a receive channel in a storage location of addressing store 114, therefore establishes a connection between the receive channel and the primary intermediate channel with which the storage location is associated.

The primary intermediate highway 113, coming from multiple group unit 103, and the corresponding primary intermediate highways 115 and 116, coming from the multiple group units 104 and 105, form the inputs of a single-stage space-division switching network 117. The outputs of the switching network are formed by the 480-channel secondary intermediate highways 118, 119 and 120. The switching network comprises controllable crosspoint members for connecting each input to each output. These controllable crosspoint members are referred to as crosspoints.

The crosspoints of the primary intermediate highway 113 are controlled by a cyclic addressing store 121 in multiple group unit 103 via a decoder 122. Under the control of this store each primary intermediate channel of intermediate highway 113 may be connected to a secondary intermediate channel of each secondary intermediate highway 118, 119 and 120 coinciding in time therewith, i.e. a secondary intermediate channel having the same number as the primary intermediate channel.

The addressing store 121 comprises 480 storage locations which are associated in a one-to-one relationship with the primary intermediate channels of intermediate highway 113. The operation of all addressing stores is in principle the same as the operation of the addressing store 114, and it will therefore not be described again for each addressing store.

Each storage location of the addressing store 121 may contain the address of a secondary intermediate highway. This address identifies the crosspoint of the secondary intermediate highway and the primary intermediate highway 113, and when supplied to decoder 122 ensures that the crosspoint is closed. The storage of the address of a secondary intermediate highway in a storage location of addressing store 121 thus establishes a connection between the primary intermediate channel with which the storage location is associated and the secondary intermediate channel, having the same number as the primary intermediate channel, of the secondary intermediate highway.

The crosspoints of the intermediate lines 115 and 116 are controlled in an analogous manner from the multiple group units 104 and 105 via decoders 123 and 124.

The secondary intermediate highways 118, 119 and 120 form the inputs of the outgoing multiple group units 125, 126, 127. The multiple group units 126 and 127 are constructed in the same manner as the multiple group unit 125 and are represented by blocks. The 32-channel send highways 128-0, 128-1 and 128-7 are connected to multiple group unit 125. These highways form the first, second and eighth highway respectively of a group of eight highways 128. This group will be referred to as an multiple send group. Multiple send groups 129 and 130 are connected to the multiple group units 126 and 127.

The secondary intermediate highway 118 is connected in multiple group unit 125 to the input of a second-order demultiplexer 131. This demultiplexer distributes the channels of the secondary intermediate highway 118 among the send highways. The demultiplexer 131 comprises a crosspoint between the secondary intermediate highway 118 and each of the highways of multiple group 128. The demultiplexer is controlled by a cyclic addressing store 132 via the decoder 133. The cyclic addressing store 132 comprises 480 storage locations which are associated in a one-to-one relationship with the secondary intermediate channels of intermediate highway 118. In each storage location the address, i.e., the number of a send highway, can be stored. This address identifies the crosspoint between the send highway and the secondary highway and when supplied to decoder 133 ensures that the crosspoint is closed. The storage of the address of a send highway line in a storage location of the addressing store 132 thus establishes a connection between the secondary intermediate channel with which the storage location is associated and the send highway.

Parallel-series converters 134-0, 134-1 and 134-7 are connected between demultiplexer 131 and the highways 128-0, 128-1 and 128-7 respectively. These parallel-series converters can receive a character in any sub-time interval. Each character received is delayed by the parallel-series converter until the next main time interval and is subsequently transmitted in this main time interval in series form via the send highway. In view of this operation of the parallel-series converters, each send channel of multiple ground 128 is accessible to the group of 15 secondary intermediate channels of intermediate highway 118, the channel intervals of which lie in the main time interval whose number is one lower than that of the send channel.

Of each group of 15 channels of intermediate highway 118 the channel intervals of which lie in the same main time interval, at the most one channel will supply information to a given send highway and at the most eight channels will be in use for the supply of information to the multiple group.

Each receive channel has access to each primary intermediate channel of the relevant primary intermediate highway and this intermediate line may be connected via the switching network 117 to all secondary intermediate highways, so that each incoming channel has access to all secondary intermediate channels of all secondary intermediate highways. A given outgoing channel is accessible via a group of 15 secondary intermediate channels, so that in total there are 15 possibilities of connecting each receive channel to each send channel.

For establishing a connection between a given receive channel and a given send channel, a secondary intermediate channel is to be selected from the group of 15 secondary intermediate channels giving access to the send channel. The selection criterion is that the secondary intermediate channel and the primary intermediate channel having the same number of the relevant primary intermediate highway are both free. The choice of the intermediate channel determines the address of the storage locations of the addressing stores 114, 121 and 132 which are used for the connection. In addressing store 114 the address of the receive channel is stored, in addressing store 121 the address of the multiple send group, i.e., the address of the secondary intermediate highway to be used, is stored, and in addressing store 132 the address of the send highway is stored.

The connections are selected and established by a central control unit not shown, the design of which is not of essential importance for an understanding of the present invention and hence it is not described.

Following the above description of the basic principles of the tandem exchange, reference will be made to FIGS. 2 to 9 for a detailed description of the multiple receive group unit. FIGS. 4, 5, 6 and 7 when arranged in a manner as shown in FIG. 10, illustrate in greater detail the multiple group unit 103 as shown in FIG. 1. Corresponding parts are denoted by like reference symbols.

In the exchange use is made only of digital signals having two possible voltage levels corresponding to the logical states 0 and 1. A clock pulse has a level which corresponds to that of the logical state 1, and the level of the clock pulse interval corresponds to that of the logical state 0. An AND-gate has the logical output stage 1 only if all logical input states are 1. An OR-gate has the logical output state 1 if at least one of the logical input states is 1. AND-gates are also used as transmission gates for information and clock pulses. The input which is used to bring a transmission gate into the state in which the supplied information or clock pulse is allowed to pass, i.e., to activate the AND-gate, is referred to as a control input. The input to which the information is supplied is referred to as an information input or simply input, and the input to which clock pulses are supplied is referred to as a clock pulse input or simply input. Counters and registers have a clock input which is denoted by the letter C. If the clock input has the logical voltage level 1, the register stores the applied information and, if the clock input subsequently has the logical voltage level 0, the register adapts its output state to the stored information and the register makes itself insensitive to the applied information. The output state of a counter also changes only when the voltage level of the clock input changes from 1 to 0. The changes from 1 to 0 coincide with the trailing edges of the clock pulses. Set and reset inputs dominate all other inputs and respond directly to the logical state 1.

An AND-gate which is used for transmitting a character in parallel form has a group of information inputs for receiving the bits of the character and a control input. Such an AND-gate, which may consist of a number of parallel-controlled AND-gates with one information input, is referred to as a multiple AND-gate or simply as an AND-gate.

A group of parallel lines which is used to transfer a character or other code word in parallel form is represented in the Figures by a circumscribed line.

The connection of a line to a circuit forms an input if the arrow points towards the symbol of the circuit, and forms an output in the opposite case. The connection of a group of parallel lines forms a multiple input or multiple output respectively.

Reference is first made to FIG. 2 and FIG. 3 which show the construction of the local clock and some clock signals. The local clock shown in FIG. 2 comprises a clock pulse generator 200 which generates the equidistant sequence of clock pulses *cs* illustrated in FIG. 3*a*. These clock pulses have a repetition frequency which is higher by a factor of 15 than the character repetition frequency of the receive and send highways. The clock pulse periods determine sub-time intervals. The sequence of clock pulses *cs* is applied to a modulo-15 sub-time interval counter 201. One output of counter 201, the logical state of which changes from 1 to 0 once every cycle, is connected to the clock input of a modulo-32 main time interval counter 202. The sub-time interval counter 201 has a cycle period of 15 sub-time intervals. The cycles of the sub-time interval counter determine main time intervals and the cycles of the main time interval counter determine frame time intervals. The sub-time interval counter 201 has a multiple output 203 at which the numbers of the sub-time intervals appear in a binary code. Connected to output 203 is a decoder 204 which decodes the binary coded numbers.

The outputs of decoder 204 are denoted by $S_0, S_1$, ---, $S_{14}$. Output $S_j$, where $j = 0, 1$, ---, 14, has the logical state 1 in sub-time interval No. $j$ and has the logical state 0 in the other sub-time intervals. The sub-time interval No. $j$ will hereinafter be referred to as $s_j$ and the signal at output $S_j$ as signal $S_j$.

The sub-time interval signals $S_0$, $S_1$, $S_2$, $S_3$, $S_4$ and $S_{14}$ are illustrated for some consecutive main time intervals in FIGS. 3*b*, *c*, *d*, *e*, *f* and *g*.

The main time interval counter 202 has a multiple output 205 at which the numbers of the main time intervals appear in a binary code. Connected to output 205 is a decoder 206 which decodes the binary coded numbers. The outputs of this decoder are designated $T_0, T_1$, ---, $T_{31}$. The output $T_i$, where $i = 0, 1$, ---, 31, has the logical state 1 in main time interval No. $i$ and has the logical state 0 in the other main time intervals. The main time interval No. $i$ will hereinafter be referred to as $t_i$ and the signal at output $T_i$ as signal $T_i$. The main time interval signals $T_0$, $T_1$, $T_2$ and $T_3$ are illustrated for a first portion of a frame time interval in FIGS. 3*h*, *i*, *j* and *k*. The outputs $T_o$, $T_1$, ---, $T_7$ of decoder 206 are connected to a first input of the AND-gates 207, 208, ---, 214. A second input of these AND-gates is connected to the output $S_2$ of decoder 204. AND-gate 207 has the logical output state 1 only in sub-time interval $s_2$ of main time interval $t_o$, AND-gate 208 has the logical state 1 only in sub-time interval $s_2$ of main time interval $t_1$ and, finally, AND-gate 214 has the logical state 1 only in sub-time interval $s_2$ of main time interval $t_7$. The sub-time interval $s_j$ of main time interval $t_i$ will hereinafter be referred to as $s_j$. $t_i$. The outputs of the AND-gates are designated $S_2$. $T_0$, $S_2$. $T_1$, ---, $S_2.T_7$, and the signals at these outputs as signal $S_2$. $T_o$, signal $S_2$, $T_1$, ---, signal $S_2.T_7$. The signals $S_2.T_0$, $S_2.T_1$, $S_2.T_2$ and $S_2.T_3$ are illustrated for a first portion of a frame time interval in FIG. 3*m*, *n*, *o* and *p*.

The channels of the send highways are numbered in accordance with the numbers of the main time intervals in which the characters are transmitted via these channels.

The regeneration unit 106-0 shown in FIG. 4 comprises a bit regenerator 400 which regenerates the bit sequence received from the receive highway 110-0, and applies it to the bit line BIT-*o*. A clock regenerator 401 derives from the received multiplex signal an equidistant sequence of clock pulses *cb'* having the same repetition frequency as the bits. The clock pulse periods of these clock pulses determine the bit intervals of the regenerated bits on bit line BIT-*o*. The clock pulses $cb'$ are applied to the clock input of a modulo-8 bit counter 402, to bit regenerator 400 and to a clock pulse line CLO-O. One output of bit counter 402, the logical state of which changes from 1 to 0 once every cycle, is connected to the clock input of a modulo-32 channel counter 403.

The bit counter 402 has a cycle of 8 bit intervals. The cycles of the bit counter determine the channel intervals of the characters on bit line BIT-*o*. The bit counter has a multiple output 404 at which the numbers of the bit intervals appear in a binary code. A decoder for the number 0 is connected to the output 404. The output $B'_o$ of this decoder has the logical state 1 only in the regenerated bit interval number 0. The regenerated bit interval having the number *j*, where $j$=0, 1,---,7, is denoted $b'_j$. The channel counter 403 has a multiple output 406 at which the channel numbers appear in a binary code. A decoder 407 for the number 0 is connected to output 406. The output $T'_o$ of this decoder has the logical state 1 only in the regenerated channel interval number 0. The regenerated channel interval having the number *i*, where $i$=0, 1,---,31, is denoted $t'_i$. The outputs of the decoders 405 and 407 are connected to the inputs of the AND-gate 408, the output of which is denoted $B'_o$, $T_o$. This output has the logical state 1 only in the bit interval $b'_o$ of channel interval $t'_o$. This output is connected to the frame synchronization line FS-O. The multiple output 406 of channel counter 403 also comprises the outputs 406-0 and 406-1, which are derived from the first two stages of this counter. These two stages together form a modulo-4 counter having a cycle period of 4 channel intervals. The first two bits of the channel numbers appear at the outputs 406-0 and 406-1 of the channel counter.

The outputs 406-0 and 406-1 have been combined to form a multiple address line ADD-O. References $a'_o$, $a'_1$, $a'_2$ and $a'_3$ denote the intervals of the time in which the combinations (0,0) (0,1), (1,0) and (1,1) appear at the outputs of the first two stages of channel counter 403.

A synchronization unit 409 connected to the output of bit regenerator 400 synchronizes in known manner the bit counter 402 and the channel counter 403 by means of frame synchronization information received from the receive highway 100-0, for example, via one of the channels. This synchronization unit provides a synchronization of the bit and channel counter such that for each regenerated bit of bit line BIT-O the number of the regenerated bit interval corresponds to the number of the bit in the character and the number of the regenerated channel interval corresponds to the number of the receive channel from which the bit originates.

The lines BIT-*o*, CLO-*o*, FS-*o* and ADD-*o* connect the regeneration unit 106-0 to the synchronization unit 107-0 of FIG. 5. Corresponding lines connect regeneration unit 106-1 to synchronization unit 107-1 and connect regeneration unit 106-7 to synchronization unit 107-7.

The synchronization unit 107-0 comprises the shift registers 500-0, 500-1, 500-2 and 500-3.

The bit line BIT-*o* is connected to an information input of all shift registers. The clock inputs of the shift registers are connected to the outputs of the AND-gates 501-0, 501-1, 501-2 and 501-3, one input of each being connected to clock pulse line CLO-O.

These AND-gates are controlled by the signals of addressing line ADD-O via the decoder 502. This decoder has four outputs (0), (1), (2) and (3), the output (*i*), where $i = 0, 1, 2, 3$, being connected to the control input of AND-gate **501-*i*. The code combination (0,0) sets output (0) to the logical state 1, the code combination (0,1) sets output (1) to the logical state 1, the code combination (1,0) sets the output (2) to the logical state 1, and the code combination (1,1) sets the output (3**) to the logical state 1. At output (*i*), where $i$= 0, 1, 2, 3, the signal $A'_i$ appears, this signal having the logical voltage level 1 in the intervals of the time $a'_i$.

The following correspondences exist between the regenerated channel intervals $t'$ and the intervals of the time $a'$:

$a'_o = t'_o, t'_4,---,t'_{28}$
$a'_1 = t'_1, t'_5,---,t'_{29}$
$a'_2 = t'_2, t'_6,---,t'_{30}$
$a'_3 = t'_3, t'_7,---,t'_{31}$

In the regenerated channel interval $a'_i$, where $i = 0$, 1, 2, 3, the output (*i*) of decoder 502 has the logical state 1 and the AND-gate **501-*i* is actuated. This AND-gate then allows a series of 8 clock pulses $cb'$ of clock pulse line CLO-o to pass for the storage of a sequence of 8 bits, which together form a character, in shift register 500-*i***. In this manner the bits supplied via bit line BIT-O are distributed cyclically in groups forming characters among the shift registers.

It may be deduced from the above table that the characters of the channels having the numbers 0, 4,---, 28 are stored in shift register 500-0, that the characters of the channels having the numbers 1,5,---,29 are stored in shift register 500-1, etc.

Each shift register 500-i, where $i = 0, 1, 2, 3$, has a multiple output **503-*i* which is connected to the multiple input of a multiple AND-gate 504-*i***. The character stored in the shift register appears at this multiple output in a parallel form.

The AND-gates 504-0, 504-1, 504-2 and 504-3 are controlled by the first two stages (outputs 511-0 and 511-1) of a channel counter 505 via a decoder 506. The decoder has the outputs (0), (1), (2) and (3), the output (*i*), where $i = 0, 1, 2, 3$, being connected to the control input of AND-gate 504-i. The code combination (0,0) sets output (0) to the logical state 1, the code combination (0,1) sets output (1) to the logical state 1, the code combination (1,0) sets the output (2) to the logical state 1, and the code combination (1,1) sets the output (3) to the logical state 1. The references $c_0$, $C_1$, $c_2$ and $c_3$ denote the intervals of the time in which the code combinations (0,0) (0,1) (1,0) and (1,1) appear at the outputs of the first two stages of channel counter 505.

The signal on output (*i*) of decoder 506, where $i = 0$, 1, 2, 3, is refered to as $C_i$, this signal having the logical voltage level 1 in the intervals of the time $c_i$.

The multiple outputs of AND-gates 504-0, 504-1, 504-2, 504-3 are connected to multiple inputs of the multiple OR gate 507, the multiple output of which is connected to the character line CHA-0).

Channel counter 505 is controlled by the local clock and is synchronized by the regeneration unit 106-0 so that for each character of line CHA-0 the counter indicates the number of the channel with which the character is associated. The signal $S_{14}$ of the local clock is supplied to an input of AND-gate 508, the other input of which normally has the logical state 1. The output of AND-gate 508 is connected via OR-gate 509 to the control input of AND-gate 510, so that the latter is normally actuated in each sub-time interval $s_{14}$. The output of AND-gate 510 is connected to the clock input of counter 505. The clock pulses *cs* of the local clock are applied to the clock input of AND-gate 510, so that counter 505 normally changes its output state at the end of each sub-time interval $s_{14}$. This output state normally remains unchanged during the following main time interval. The time intervals $c_i$, where $i = 0, 1, 2, 3$, normally coincide with the local main time intervals.

The signal $C_i$, where $i = 0, 1, 2, 3$, actuates the AND-gate 504-*i* in the interval of the time $c_i$. This AND-gate then allows the character presented by shift register 500-*i* at the multiple output 503-*i* to pass and, via or-gate 507, the character is applied to the character line CHA-O. In this manner the characters distributed among the shift registers 500-0, 500-1, 500-2 and 500-3 are combined again to form one character sequence on the line CHA-0, the time intervals of occurrence of the characters on the line CHA-0, i.e. the time intervals $c_i$, where $i = 0, 1, 2, 3$, normally being given by the local main time intervals.

The number of highway 100-0 is permanently stored in a binary code in a register 512. The multiple output 513 of this register and the multiple output 511 of channel counter 505 are combined to form a character address line CAD-0.

The channel counter 505 is synchronized as follows. The signal $B'_o.T'_o$ of line FS-0 is supplied to the set input of a JK-flipflop 514 and sets the latter to the logical state 1 at the beginning of a frame time interval of the regenerated time scale.

The output of flipflop 514 is connected to an input of AND-gate 515, the other input of which is connected to the output (*o*) of decoder 506 which presents the signal $C_o$. The latter signal has the logical voltage level 1 in the time intervals $c_o$. Consequently, AND-gate 515 has the logical output state 1 in the first time interval $c_o$ to occur after the beginning of a regenerated frame time interval. The output of AND-gate 515 is connected to the reset inputs of the last three stages of channel counter 505 and sets this counter to the logical state 0, or leaves it in this condition, when the logical output state of the AND-gate assumes the value 1. The first two stages are in the logical state 0 in the time interval $c_o$ so that the channel counter 505, after a possible loss of synchronization, will start its cycle at the instant that, for the first time after the beginning of a regenerated frame time interval a character is read from register 400-0. The latter character will be a character of the incoming channel number 0, for which the channel counter 505 provides, as it should, the code combination (0,0,0,0,0).

The output of AND-gate 515 is also connected to the K-input of flipflop 514. The clock pulses *cs* are applied to the clock input of this flipflop so that the flipflop is reset to the logical state 0 by the first clock pulse *cs* occuring after the instant at which AND-gate 515 is set to the logical output state 1.

The lines CHA-0, CAD-0 and a line OF-0 connect the synchronization unit 107-0 of FIG. 5 to the second-order multiplexer 108 of FIG. 6. The purpose of the line OF-0 will be explained hereinafter. Corresponding lines connect the synchronization units 107-1 and 107-7 to the multiplexer 108.

The line CHA-*i*, where $i = 0,1,\text{---},7$, is connected to the multiple input of a multiple AND-gate 600-*i*, and the line CAD-*i* is connected to the multiple input of a multiple AND-gate 601-*i*. The multiple outputs of the AND-gates 600-0, 600-1 and 600-7 are connected to multiple inputs of an OR-gate 602-0, the multiple output of which is connected to the 480-channel highway 109-0. The multiple outputs of the AND-gates 601-0, 601-1 and 601-7 are connected to multiple inputs of a multiple OR-gate 602-1, the multiple output of which is connected to the highway 109-1.

The signal $S_4$ of the local clock is applied to the control inputs of the AND-gates 600-0 and 601-0 via OR-gate 603-0. The signal $S_5$ is applied to the control inputs of the AND-gates 600-1 and 601-1 via the OR-gate 603-1 and, finally the signal $S_{11}$ is applied to the control inputs of the AND-gates 600-7 and 601-7 via the OR-gate 603-7. The signal $S_4$ actuates the AND-gates 600-0 and 601-0 in each sub-time interval $s_4$, the signal $S_5$ actuates the AND-gates 600-1 and 601-1 in each sub-time interval $s_5$ and, finally, the signal $S_{11}$ actuates the AND-gates 600-7 and 601-7 in each sub-time interval $s_{11}$. In this manner a character of line CHA-0 is applied to highway 109-0 and a channel address of line CAD-0 is applied to highway 109-1 in each sub-time interval $s_4$. In each sub-time interval $s_5$ a character of line CHA-1 is applied to highway 109-0 and a channel address of line CAD-1 is applied to line 109-1 and finally, in each sub-time interval $s_{11}$ a character of line CHA-7 is applied to highway 109-0 and a channel address of line CAD-7 is applied to highway 109-1. In this manner the eight spatially distributed character sequences of the highways of multiple group 100 are combined to form one second-order multiplex character sequence on the highway 109-0, and the corresponding channel address sequences are combined to form one second-order multiplex channel address sequence on the highway 109-1.

The highways 109-0 and 109-1 connect the multiplexer 108 to the switching store 112 shown in FIG. 7. The switching store comprises sectors 700-0, 700-1,---700-7, only the first, second and eighth sectors being shown. The sectors 700-1 and 700-7 are constructed in the same manner as the sector 700-0 and are represented in the Figure by blocks.

The sector 700-0, associated with highway 100-0, comprises channel registers 700-0, 701-1,---701-31, of which only the first, the second and the last one are shown. The channel register 701-*j*, where $j = 0, 1,\text{---}, 31$, is associated with the channel No. *j*.

The highway 109-0 is connected to a multiple input of each of the channel registers of switching store 112. The highway 109-1 is divided into two highways 702-0 and 702-1, highway 702-0 carrying the line numbers and line 702-1 carrying the channel numbers. Highway 702-0 is connected to a decoder 703, which decodes the binary coded line numbers. The line number *i*, where $i = 0, 1, \text{---} 7$, sets the output (*i*) of decoder 703 to the logical state 1. The highway 702-0 is connected to a decoder 704 which decodes the binary coded channel numbers. The channel number *j*, where $j = 0, 1, \text{---}, 31$, sets the output (*j*) of decoder 704 to the logical state 1.

Two AND-gates 705-*j* and 706-*j* are associated with each channel register 701-*j*, where $j = 0, 1\text{---}31$. The output of AND-gate 705-*j* is connected to a control input of AND-gate 706-*j*. The output of the latter is connected to the clock input of channel register 701-$j$. The clock pulses $cs$ are applied to a second input of AND-gate 706-$j$. One input of each of the AND-gates 705-0, 705-1,---, 705-31 of sector 700-$i$, where $i = 0$, 1,---,7, is connected to output ($i$) of decoder 703. A second input of AND-gate 706-j, where $j = 0$, 1,---, 31, of each sector is connected to output ($j$) of decoder 704. Upon reception of the line number $i$, where $i = 0$, 1,---, 7, and the channel number $j$, where j = 0, 1,---, 31, AND-gate 705-$j$ of sector 700-$i$ is set to the logical output state 1, so that AND-gate 706-$j$ is actuated. The latter allows one clock pulse $cs$ to pass so that the character received from highway 109-0 is stored in the channel register 701-$j$. In this manner all characters received from highway 109-0 are distributed over the channel registers in accordance with the channel addresses.

The cyclic addressing store 114, controlling the connection of the receive channels of multiple group 100 to the primary intermediate channels of intermediate highway 113, consists of two portions 114-0 and 114-1, each of which has 480 storage locations. The line numbers are stored in portion 114-0 and the channel numbers are stored in portion 114-1. In storage location No 3 of portion 114-0, for example, the line number 7 is stored, and in storage location 3 of portion 114-0, for example, the channel number 18 is stored. This indicates that a connection exists between the channel having the number 18 of highway 100-7 and the primary intermediate channel number 3 of intermediate highway 113.

The multiple output of portion 114-0 is connected to a decoder 707 which decodes the binary coded line numbers. The line number $i$, where $i = 0$,1,---, 7, sets the output ($i$) to the logical state 1. The multiple output of portion 114-1 is connected to a decoder 708 which decodes the binary coded channel numbers. The channel number $j$, where $j = 0$, 1,---, 31, sets output ($j$) to the logical state 1.

The multiple AND-gate 709-$j$ is associated with the channel register 701-$j$, where $j = 0$, 1,---, 31. The multiple input of this gate is connected to the multiple output of the channel register 701-$j$. The multiple outputs of the AND-gate 709-0, 709-1,---, 709-31 are connected to multiple inputs of a multiple OR-gate 710, the multiple output of which is connected to the multiple input of the multiple AND-gate 711.

The control input of AND-gate 709-$j$, where $j = 0$, 1, ---, 31, of each sector is connected to output ($j$) of decoder 708. The AND -gate 711 of sector 700-$i$, where $i = 0$, 1, ---,7, is connected to output ($i$) of decoder 707. Upon reception of the line number $i$ and the channel number $j$ the AND-gate 709-$j$ and the AND-gate 711 are actuated only in the sector 700-$i$, so that only the character stored in the channel register 701-$j$ of this sector is applied to the intermediate highway 113. In this manner all receive channels the addresses of which are stored in the addressing store 114 are connected to the primary intermediate channels of intermediate highway 113 in accordance with the channel addresses stored in the storage locations associated with the primary intermediate channels.

Reference is now made to the FIGS. 5, 8 and 9 for the explanation of the operation of the synchronization unit 107-0 in the case that a shift varying with time is present between the regenerated time scale of regeneration unit 106-0 and the local time scale of the clock according to FIG. 2.

The following is a brief summary of the preceding description of synchronization unit 107-0.

In time interval $a'_i$, where $i = 0, 1, 2, 3$, a character is stored in series form in shift register 500-$i$. Each time interval $a'_i$ coincides with a regenerated main time interval.

The regenerated main time interval $t'_o$ coincides with a time interval $a'_o$. Furthermore, reference is made to the previously given table of correspondences between the main time intervals $t'$ and the time intervals $a'$.

In the time interval $c_i$ where $i = 0, 1, 2, 3$, AND-gate 504-$i$ is actuated so as to supply the character stored in register 500-$i$ to line CHA-$o$. Each time interval $c_i$ normally coincides with a local main time interval. A character supplied to line CHA-$o$ is normally transmitted to line 109-0 by multiplexer 108 in the sub-time interval $s_4$.

Hereinafter the time interval $a'_i$, where $i = 0, 1, 2, 3$, will be referred to as the write interval, the time interval $c_i$ as the read interval, and the sub-time interval $s_4$ of time interval $c_i$ as the read instant of shift register 500-$i$.

Reference is made to FIGS. 8 and 9. Each of these Figures consists of three portions viewed from left to right: a left-hand portion, a center portion and a right-hand portion. From left to right a time axis is plotted which is interrupted between the portions. In each portion the division of the time axis into local frame time intervals is shown in line $a$. Each portion covers a time interval which is chosen smaller than a frame time interval for the sake of surveyability. Line $b$ shows the division of the time axis into local main time intervals. Line $c$ shows the division of the time axis into read intervals $c_1$, $c_2$, $c_3$, $c_4$. The read instants are indicated by shading. Line $d$ shows the division of the time axis into write intervals $a'_1$, $a'_2$, $a'_3$ and $a'_4$. Line $e$ shows the division of the time axis into regenerated main time intervals.

We will first consider shift register 500-0. The smallest distance between a read instant and a write interval of this shift register is indicated by $\tau_1$ in some places between the lines $c$ and $d$ of FIG. 8, and by $\tau_2$ in some places between the lines $c$ and $d$ of FIG. 9. FIG. 8 refers to the case that the remote clock is faster than the local clock and/or that the delay time in the transmission path decreases with time. This is expressed by the arrows which are drawn in the left-hand portion of FIG. 8 above the lines $d$ and $e$ and which symbolize the direction of the relative shift of the regenerated time scale with respect to the local time scale. In this case the read instant will be situated ever closer to and before the write interval and $\tau_1$ decreases. The left hand portion of FIG. 8 covers a portion of the local frame time interval $r_{x1}$. As the relative decrease of $\tau_1$ in one frame time interval is very slight when stable clocks are used, the time scale is interrupted, and in the center portion of FIG. 8 the situation is illustrated which may occur after $Y_1$ frame time intervals. In this situation overlapping occurs between the read interval and the write interval. If $\tau_1$ is further reduced, the read instant is liable to coincide with the write interval. The occurrence of overlapping between the read interval and the write interval is investigated with the aid of the signal $C_o$ of output (0) of decoder 506 and the signal $B'_o$, $T'_o$ of line FS-0. The signal $C_o$ has the logical voltage level 1 in the time interval $c_o$, i.e. the read interval under consideration. This signal is illustrated in line $f$ of FIG. 8. The signal $B'_o.T'_o$ has the logical voltage level 1 in the bit interval $b'_o$ of the regenerated main time interval $t'_o$. This signal is illustrated in line $g$ of FIG. 8.

One input of an AND-gate 516 of synchronization unit 107-0 according to FIG. 5 is connected to output (0) of decoder 506 and receives the signal $C_o$. The second input of AND-gate 516 is connected to line FS-0 and receives the signal $B'_o.T'_o$. If the signal $C_o$ and the signal $B'_o.T'_o$ simultaneously have the logical voltage level 1, as is the case in the situation illustrated in the center portion of FIG. 8, AND-gate 516 has the logical output state 1. The output of AND-gate 516 is connected to the J-input of a JK-flipflop 517. The clock pulses $cs$ are applied to the clock input of this flipflop. The clock pulses $cs$, which occurs in the time interval in which AND-gate 516 has the logical output state 1, sets the flip-flop 517 to the state 1. The signal of the 1-output of flipflop 517 is designated F and is illustrated in FIG. 8, line $h$.

The 1-output of flipflop 517 is connected to an input of an AND-gate 518. The signal $S_2.T_o$ of the local clock is applied to the other input of AND-gate 518. The output of AND-gate 518 is connected to the line OF-0 and to an input of OR-gate 509, the output of which is connected to the control input of AND-gate 510. AND-gate 510 is normally actuated in the sub-time intervals $s_{14}$ as described hereinfore. When the signal F has the logical voltage level 1, AND-gate 518 has the logical voltage level 1 in the next-sub-time interval $s_2.t_o$, and AND-gate 510 is actuated in this sub-time interval. Channel counter 505 then changes its output condition at the end of this sub-time interval, which hereinafter will be referred to as the correction interval. The output of AND-gate 518 is also connected to the K-input of flipflop 517, so that the latter is reset to the logical state 0 at the end of the correction interval.

The time intervals $c$ reflect the condition combinations of the first two stages of channel counter 505. This is the case because each condition combination sets an associated output of decoder 506 to the logical state 1, and $c_o$, $c_1$, $c_2$ and $c_3$ indicate the time intervals in which the outputs (0), (1), (2) and (3) are in the logical state 1. We will consider the clock pulse allowed to pass by AND-gate 510 in the sub-time interval $s_{14}$ preceding the correction interval, the clock pulse in the correction interval, and the clock pulse in the sub-time interval $s_{14}$ following the correction interval. The read interval coinciding with the main time interval $t_{31}$ preceding the correction interval $s_2.t_o$, will be referred to as $c_x$. The first clock pulse terminates the time interval $c_x$ and starts the time interval $c_{1(x+1)mod.4}$. The second clock pulse terminates the time interval $c_{1(x+1)mod.4}$ and starts the time interval $c_{1(x+2)\ mod.4}$, and the third clock pulse terminates the time interval $c_{1(x+2)mod.4}$ and starts the time interval $c_{1(x+3)mod.4}$. For the situation illustrated in the center portion of FIG. 8 we have: $x = 0$, so that $c_{1(x+1)mod.4} = c_1$, $c_{1(x+2)mod.4} = c_2$ and $c_{1(x+3)mod.4} = c_3$. The sub-time interval $c_{1(x+1)mod.4}$ has a duration of three sub-time intervals and the time interval $c_{1(x+2)mod.4}$ has a duration of 12 sub-time intervals.

In the time interval $c_{1(x+1)mod.4}$ the AND-gate 504-(x+1)mod.4 is actuated, so that the character stored in shift register 500-(x+1)mod.4 is applied to line CHA-$o$. Channel counter 505 supplies the associated channel number to the line CAD-0. In the case that $x$=0, the AND-gate 504-1 is actuated in the time interval $c_1$, so that the character stored in shift register 500-1 is applied to line CHA-0.

The line OF-0 is connected in multiplexer 108 via OR-gate 603-0 to the control input of the multiple AND-gates 600-0 and 601-0, which are connected between lines CHA-0 and CAD-0 on the one side, and the highways 109-0 and highways 1 on the other side. Under the control of the signal of line OF-0 multiplexer 108 in each correction interval $s_2.t_o$ in which line OF-0 has the logical voltage level 1 transfers the character of line CHA-0 to highway 109-0 and at the same time transfers the channel address of the character of line CAD-0 to highway 109-1. The correction interval $s_2.t_o$ forms the read instant of the (reduced) read interval $c_{1(x+1)mod.4}$. This additional read instant is indicated in the center portion of FIG.8 by shading and is situated in the (reduced) read interval $c_1$.

The next (reduced) read interval $c_{1(x+2)mod.4}$ retains the read instant $s_4$, at which read instant the character of shift register 500-(x+2)mod.4 is applied, via the multiplexer 108, to highway 109-0, and the channel address of the character is applied, via the multiplexer 108, to highway 109-1. The next read interval $c_{1(x+3)mod.4}$ is a read interval of normal length again.

The right-hand portion of FIG. 8 shows the situation one frame time interval after the situation of the center portion of this Figure. It will be seen that $\tau_1$ has increased by an amount equal to one main time interval.

The distance between the read instant of a shift register and the write interval thereof is the same for all shift registers so that the above remarks with respect to the distance $\tau_1$ for shift register 500-0 are applicable to all shift registers. The result of the additional step of channel counter 505 at the end of the correction interval $s_2.t_o$ is that the read instant of each shift register is advanced with respect to the write interval thereof. In this manner the relative shift of the regenerated time scale with respect to the local time scale is compensated by a relative shift in the same direction of the time scale of the read intervals $c$ with respect to the local time scale.

The sub-time intervals $s_2.t_o$ are the channel intervals of a channel of the 480-channel highway 109-0. Normally, the 32 receive channels of highway 100-0 make use of those 32 channels of highway 109-0 the channel intervals of which are the sub-time intervals $s_4$. The channel whose channel intervals are the sub-time intervals $s_2.t_o$ constitutes an overflow channel via which those characters are transferred which are received from highway 100-0 in excess of the number which can be transferred via the group of 32 channels of line 109-0.

In the same manner as described for synchronization unit 107-0 of the receive highway 100-0, the channel of highway 109-0 whose channel intervals are the sub-time intervals $s_2.t_1$ constitutes the overflow channel for the receive highway 100-1, and the channel of highway 109-0 whose channel intervals are the sub-time intervals $s_2.t_7$ constitutes the overflow channel for the receive highway 100-7. In this manner, eight overflow channels are used for the multiple group 100.

An overflow channel is not used to full capacity. A channel interval of the overflow channel is used only to transfer a character if an appropriate instruction in the form of the logical voltage level 1 of signal F is present. The number of these correction instructions in a given period of time is dependent upon the stability of the clocks and the storage capacity of the synchronization unit. In the case of a high stability and/or a large storage capacity, the correction instructions will have a low frequency of occurrence. In principle it is then possible to use sub-channels of line 109 for the overflow. A sub-channel is a channel which uses in each super frame-time interval, which comprises a number of frame time intervals, one channel interval having the same relative position in each super frame-time interval. As an alternative one or two (main) channels may be used which are associated on demand with the highways of the multiple group in order to transfer the overflow characters thereof.

The characters which are supplied to the switching store 112 via the overflow channels are stored therein under the control of the simultaneously transferred channel addresses in the same manner as are the characters which are applied to the switching store via the normally used channels. The use of these overflow channels, ensures an entirely loss-free transfer of information from the channels of the multiple group to the switching store.

The following is a brief description of the case in which the remote clock is slower than the local clock and/or the delay time of the signals in the transmission path increases with time. The situation on which the description is based is illustrated in the left-hand portion of FIG. 9, which comprises a portion of a local frame time interval $r_{x2}$. After $Y_2$ frame time intervals the situation as illustrated in the center portion of FIG. 9 may occur. In this situation there is no space between the write interval and the read interval of a shift register. From the center portion of FIG. 9 it may be seen that the read interval $c_3$ of shift register 500-3 starts at the instant that the write interval $a'_3$ is terminated. For detecting the disappearance of the space between the write interval and the read interval use is made of the signal $C_3$ of output (3) of decoder 506 and of the signal $B'_o.T'_o$ of line FS-0 of regeneration unit 106-0. The signal $C_3$ is illustrated in line $f$ and the signal $B'_o.T'_o$ is illustrated in line $g$.

In synchronization unit 107-0, FIG. 5, line FS-0 is connected to an input of AND-gate 519 and the output (3) of decoder 506 is connected to a second output of AND-gate 519. The output of AND-gate 519 is connected to the J-input of JK-flipflop 520 to which the clock pulses $cs$ are applied. In the situation illustrated in the center portion of FIG. 9, a time interval exists in which both the signal $C_3$ and the signal $B'_oT'_o$ have the logical voltage level 1. The clock pulse $cs$ occurring in this time interval sets flipflop 520 to the logical state 1. The signal of the 1-output of flipflop 520 will be referred to as the signal SL and is illustrated in FIG. 9, line $h$. The 0-output of flipflop 520 is connected to an input of gate 508, the signal $S_{14}$ of the local clock being applied to the other input of this gate. The latter signal is normally allowed to pass by AND-gate 508 and actuates, via OR-gate 509, the AND-gate 510 in each sub-time interval $s_{14}$ in order to change the contents of channel counter 505. When flipflop 520 has the logical state 1, the 0-output has the logical voltage level 0 and AND-gate 508 is in the logical output state 0 irrespective of signal $S_{14}$. The 1-output of flipflop 520 is connected to an input of an AND-gate 521, the output of which is connected to the K-input of the flipflop. The signal $S_{14}$, of the local clock is applied to a second input of AND-gate 521. Flipflop 520 is then reset to the logical state 0 at the end of the first sub-time interval $s_{14}$ to occur after the flipflop has been set to the logical state 1. In this sub-time interval the 0-output still has the logical voltage level 0 so that AND-gate 510 is inoperative in this sub-time interval and the contents of the channel counter is not changed. In this case one read interval is produced having a duration of two main time intervals. In the situation illustrated in FIG. 9 this is the read interval $c_3$. This (lengthened) read interval $c_3$ includes two read instants. At these two instants the character stored in shift register 500-2 is transferred to the switching store 112. In the right-hand portion of FIG. 9 the situation is illustrated which occurs one frame time interval after the situation shown in the center portion of this figure. It will be seen from the center and right hand portions of FIG. 9 that owing to the fact that during the sub-time interval $s_{14}$ the channel counter 505 makes "a step at the place" $\tau_2$ has increased by an amount equal to one main time interval. The result of the "step at the place" of the channel counter 505 is that the read instant of each shift register is postponed with respect to the write interval thereof. Thus, the relative shift of the regenerated time scale with respect to the local time scale is compensated for by a relative shift in the same direction of the time scale of the read intervals $c$ with respect to the local time scale.

What is claimed is:

1. A telecommunication system comprising a plurality of sources of multiplex telecommunication signals, each of the sources comprising a plurality of signal transmission channels; a plurality of clocks, each clock corresponding to one of the sources, each clock being adapted for generating a time scale which is divided into equal frame time intervals, each of the frame time intervals being divided into equal main time intervals, means for sampling the output of an associated source for supplying an information character during each of the main time intervals in response to its associated clock; a local clock for generating a local time scale which is divided into equal local frame time intervals, each of the local frame time intervals being divided into equal main time intervals, each of the local main time intervals being divided into equal sub-time intervals; a plurality of synchronization units, each synchronization units corresponding to one of the sources, each of the synchronization units comprising means for temporarily storing the information characters supplied by the associated source in synchronization unit storage locations, and means for generating a coded address corresponding to each of said synchronization storage locations; an information storage unit comprising a plurality of groups of addressable channel registers, each group of channel registers being corresponding to one of the signal transmission channels, and a multiplex transfer unit connected between the synchronization units and the information storage unit and comprising a plurality of groups of connection channels, said plurality of groups of connection channels having a number of connection channels equal to the number of the single transmission channels in the plurality of sources; means including said local clock and the coded addresses from the synchronization unit for periodically effecting a transfer of the information characters stored in the plurality of synchronization units to the corresponding addresses in the plurality of groups of channel registers; a sub-time interval in each of the local frame time intervals corresponding to each of the connection channels being in the same relative position in time; said synchronization unit further comprising detection means for providing an overflow indication signal in response to a condition wherein the flow of information characters into the synchronization unit exceeds the flow of characters to the information storage unit, the address generating means further comprising means for generating overflow addresses corresponding to the excess characters; said multiplex transfer units including a plurality of overflow channels for the transfer of the excess information characters to the plurality of groups of channel registers under the control of the local clock and the overflow addresses from the plurality of synchronization units; a sub-time interval in each local frame time intervals associated with each overflow channel having the same relative position in time.

2. A telecommunication system as claimed in claim 1, wherein an overflow channel is permanently associated with each of the plurality of synchronization units.

* * * * *